US008005077B1

(12) United States Patent
Dougherty et al.

(10) Patent No.: US 8,005,077 B1
(45) Date of Patent: Aug. 23, 2011

(54) DISTRIBUTIVELY ROUTED VDSL AND HIGH-SPEED INFORMATION PACKETS

(75) Inventors: Angus O. Dougherty, Westminster, CO (US); Donald L. Hohnstein, Greeley, CO (US); Charles I. Cook, Louisville, CO (US); Guy M. Wells, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 2212 days.

(21) Appl. No.: 09/605,696

(22) Filed: Jun. 28, 2000

Related U.S. Application Data

(63) Continuation-in-part of application No. 09/505,271, filed on Feb. 16, 2000, now Pat. No. 7,388,846.

(60) Provisional application No. 60/152,730, filed on Sep. 8, 1999, provisional application No. 60/185,788, filed on Feb. 29, 2000.

(51) Int. Cl.
*H04L 12/66* (2006.01)

(52) U.S. Cl. ............................. 370/356; 370/400; 370/466

(58) Field of Classification Search .................. 370/225, 370/230, 231, 235, 352, 353, 355, 389, 392, 370/395.1, 397, 400, 401, 409, 412, 428, 370/270, 279, 293, 315, 492, 370, 356, 438, 370/445, 479, 489, 497, 331, 328, 338; 455/428, 455/434, 435, 436, 445; 348/91, 93, 95, 348/96, 87; 725/62, 63–64, 65, 66, 67, 68, 725/69, 70, 71, 72, 73, 74, 81, 82, 86, 87, 725/92, 95, 98, 101, 108, 104, 105, 106, 725/109, 114, 118
See application file for complete search history.

(56) References Cited

U.S. PATENT DOCUMENTS

| 4,317,229 | A | | 2/1982 | Craig et al. |
| 4,881,082 | A | | 11/1989 | Graziano |
| 4,930,118 | A | | 5/1990 | Sugihara |
| 5,068,916 | A | | 11/1991 | Harrison et al. |
| 5,150,473 | A | | 9/1992 | Zulch |
| 5,195,016 | A | | 3/1993 | Powers |
| 5,257,257 | A | | 10/1993 | Chen et al. |
| 5,315,584 | A | | 5/1994 | Savary et al. |
| 5,339,316 | A | * | 8/1994 | Diepstraten ................... 370/401 |

(Continued)

FOREIGN PATENT DOCUMENTS

WO    WO 97/48210    12/1997

(Continued)

OTHER PUBLICATIONS

T. T. Lee, "Non-blocking Copy Networks for Multicast Packet Switching," Digital Communications, Mapping New Applications onto New Technologies, 1988 International Zurich Seminar on Mar. 8-10, 1988, pp. 221-229.*

(Continued)

*Primary Examiner* — Donald L Mills

(57) ABSTRACT

High-speed information packets are routed through a distributed communication system. Each packet destined for a subscriber unit is provided with an address indicating a destination within the communication system. In each distribution point along the path to the destination, a determination is made as to which distribution point each packet will be forwarded based on the address. Each packet is received in an access point servicing the destination, and the packet is forwarded to the destination subscriber unit.

23 Claims, 11 Drawing Sheets

U.S. PATENT DOCUMENTS

| | | |
|---|---|---|
| 5,341,395 A | 8/1994 | Bi |
| 5,353,300 A | 10/1994 | Lee et al. |
| 5,390,170 A | 2/1995 | Sawant et al. |
| 5,400,040 A | 3/1995 | Lane et al. |
| 5,406,550 A | 4/1995 | McTiffin |
| 5,408,237 A | 4/1995 | Patterson et al. |
| 5,410,568 A | 4/1995 | Schilling |
| 5,461,610 A | 10/1995 | Weerackody |
| 5,473,602 A | 12/1995 | McKenna et al. |
| 5,475,732 A | 12/1995 | Pester, III |
| 5,479,400 A | 12/1995 | Dilworth et al. |
| 5,504,744 A | 4/1996 | Adams et al. |
| 5,513,183 A | 4/1996 | Kay et al. |
| 5,517,504 A | 5/1996 | Tran et al. |
| 5,517,617 A | 5/1996 | Sathaye et al. |
| 5,526,376 A | 6/1996 | Kellenberger et al. |
| 5,563,892 A * | 10/1996 | Kostreski et al. ............ 370/487 |
| 5,566,165 A | 10/1996 | Sawahashi et al. |
| 5,572,528 A | 11/1996 | Shuen |
| 5,590,133 A | 12/1996 | Billstrom et al. |
| 5,640,414 A | 6/1997 | Blakeney, II et al. |
| 5,641,141 A | 6/1997 | Goodwin |
| 5,646,635 A | 7/1997 | Cockson et al. |
| 5,673,263 A | 9/1997 | Basso et al. |
| 5,673,264 A * | 9/1997 | Hamaguchi ................ 370/397 |
| 5,708,659 A | 1/1998 | Rostoker et al. |
| 5,715,250 A | 2/1998 | Watanabe |
| 5,726,984 A | 3/1998 | Kubler et al. |
| 5,729,549 A | 3/1998 | Kostreski et al. |
| 5,737,328 A | 4/1998 | Norman et al. |
| 5,737,333 A | 4/1998 | Civanlar et al. |
| 5,761,195 A | 6/1998 | Lu et al. |
| 5,764,645 A | 6/1998 | Bernet et al. |
| 5,793,758 A | 8/1998 | Penners |
| 5,794,116 A * | 8/1998 | Matsuda et al. ............ 725/114 |
| 5,805,996 A | 9/1998 | Salmela |
| 5,809,415 A | 9/1998 | Rossman |
| 5,815,809 A | 9/1998 | Ward et al. |
| 5,819,182 A | 10/1998 | Gardner et al. |
| 5,825,759 A | 10/1998 | Liu |
| 5,828,844 A | 10/1998 | Civanlar et al. |
| 5,867,485 A * | 2/1999 | Chambers et al. ............ 370/281 |
| 5,872,588 A * | 2/1999 | Aras et al. .................... 725/14 |
| 5,875,181 A * | 2/1999 | Hsu et al. .................... 370/320 |
| 5,886,738 A | 3/1999 | Hollenbeck |
| 5,889,770 A | 3/1999 | Jokiaho et al. |
| 5,890,055 A | 3/1999 | Chu et al. |
| 5,894,478 A | 4/1999 | Barzegar et al. |
| 5,896,369 A | 4/1999 | Warsta et al. |
| 5,898,904 A | 4/1999 | Wang |
| 5,901,356 A | 5/1999 | Hudson |
| 5,903,372 A * | 5/1999 | Czerwiec .................... 398/66 |
| 5,903,559 A | 5/1999 | Acharya et al. |
| 5,907,555 A | 5/1999 | Raith |
| 5,907,816 A | 5/1999 | Newman et al. |
| 5,909,430 A | 6/1999 | Reaves |
| 5,930,247 A | 7/1999 | Miller, II et al. |
| 5,935,209 A | 8/1999 | Budhraja et al. |
| 5,936,754 A | 8/1999 | Ariyavisitakul |
| 5,943,321 A | 8/1999 | St-Hilaire et al. |
| 5,958,018 A | 9/1999 | Eng et al. |
| 5,963,178 A | 10/1999 | Jones |
| 5,970,406 A | 10/1999 | Komara |
| 5,970,410 A | 10/1999 | Carney et al. |
| 5,978,650 A | 11/1999 | Fischer et al. |
| 6,006,096 A | 12/1999 | Trompower |
| 6,009,096 A | 12/1999 | Jaisingh et al. |
| 6,009,097 A | 12/1999 | Han |
| 6,009,099 A * | 12/1999 | Lewis et al. .................... 370/397 |
| 6,021,263 A | 2/2000 | Kujoory et al. |
| 6,046,978 A * | 4/2000 | Melnik .......................... 370/221 |
| 6,047,006 A | 4/2000 | Brakefield et al. |
| 6,049,533 A * | 4/2000 | Norman et al. ................ 370/328 |
| 6,052,744 A * | 4/2000 | Moriarty et al. ............... 710/27 |
| 6,061,579 A | 5/2000 | Arai et al. |
| 6,069,592 A | 5/2000 | Wass |
| 6,078,787 A | 6/2000 | Schefte |
| 6,091,788 A | 7/2000 | Keskitalo et al. |
| 6,100,849 A | 8/2000 | Tsubaki et al. |
| 6,108,314 A | 8/2000 | Jones et al. |
| 6,128,512 A | 10/2000 | Trompower et al. |
| 6,132,306 A | 10/2000 | Trompower |
| 6,141,341 A | 10/2000 | Jones et al. |
| 6,141,565 A | 10/2000 | Feuerstein et al. |
| 6,175,747 B1 | 1/2001 | Tanishima et al. |
| 6,219,563 B1 | 4/2001 | Pillekamp et al. |
| 6,240,074 B1 | 5/2001 | Chandos et al. |
| 6,243,585 B1 * | 6/2001 | Pelech et al. ................... 455/449 |
| 6,289,017 B1 | 9/2001 | Shani et al. |
| 6,301,238 B1 | 10/2001 | Hagerman et al. |
| 6,304,578 B1 * | 10/2001 | Fluss ............................. 370/413 |
| 6,330,244 B1 | 12/2001 | Swartz et al. |
| 6,351,237 B1 | 2/2002 | Martek et al. |
| 6,359,901 B1 * | 3/2002 | Todd et al. ..................... 370/465 |
| 6,363,070 B1 * | 3/2002 | Mullens et al. ................ 370/389 |
| 6,366,584 B1 * | 4/2002 | Gulliford et al. ............. 370/403 |
| 6,370,185 B1 | 4/2002 | Schmutz et al. |
| 6,381,473 B1 | 4/2002 | Niki |
| 6,405,049 B2 | 6/2002 | Herrod et al. |
| 6,421,731 B1 * | 7/2002 | Ciotti et al. .................... 709/238 |
| 6,487,457 B1 | 11/2002 | Hull et al. |
| 6,505,255 B1 | 1/2003 | Akatsu et al. |
| 6,510,152 B1 * | 1/2003 | Gerszberg et al. ............. 370/352 |
| 6,512,756 B1 * | 1/2003 | Mustajaarvi et al. ......... 370/341 |
| 6,526,581 B1 | 2/2003 | Edson |
| 6,542,117 B1 | 4/2003 | Broughton |
| 6,560,234 B1 | 5/2003 | Ben-Michael et al. |
| 6,563,827 B1 | 5/2003 | Brueckheimer et al. |
| 6,564,060 B1 | 5/2003 | Hoagland |
| 6,577,643 B1 | 6/2003 | Rai et al. |
| 6,584,080 B1 * | 6/2003 | Ganz et al. .................... 370/315 |
| 6,584,096 B1 | 6/2003 | Allan |
| 6,587,457 B1 * | 7/2003 | Mikkonen .................... 370/956 |
| 6,587,468 B1 * | 7/2003 | Dos Santos et al. .......... 370/401 |
| 6,600,734 B1 | 7/2003 | Gernert et al. |
| 6,628,627 B1 | 9/2003 | Zendle et al. |
| 6,653,933 B2 | 11/2003 | Raschke et al. |
| 6,671,882 B1 * | 12/2003 | Murphy et al. ................. 725/54 |
| 6,738,637 B1 | 5/2004 | Marinho et al. |
| 6,751,221 B1 * | 6/2004 | Saito et al. ..................... 370/392 |
| 6,757,268 B1 | 6/2004 | Zendle |
| 6,765,918 B1 | 7/2004 | Dixon et al. |
| 6,795,863 B1 | 9/2004 | Doty, Jr. |
| 6,850,512 B1 | 2/2005 | Bishop et al. |
| 6,853,637 B1 | 2/2005 | Norrell et al. |
| 7,016,308 B1 * | 3/2006 | Gallagher ..................... 370/241 |
| 7,054,376 B1 * | 5/2006 | Rubinstain et al. ........... 375/261 |
| 2001/0006509 A1 * | 7/2001 | Nguyen et al. ................ 370/281 |
| 2002/0037004 A1 | 3/2002 | Bossemeyer et al. |
| 2002/0181485 A1 | 12/2002 | Cao et al. |
| 2003/0144018 A1 | 7/2003 | Minnick et al. |

FOREIGN PATENT DOCUMENTS

| | | |
|---|---|---|
| WO | WO 98/09440 | 3/1998 |

OTHER PUBLICATIONS

Eliminates Anarchy at the Internet Access Point and Improves Performance! NetRoad TrafficWARE product information sheet by Ukiah Software, Inc., 1997, 2 pgs.

Product Catalog, Twist-Lock Photoelectric Controls, 282 Series, www.fisherprice.com/282.htm pp. 1-2.

Cohen, Danny et al., "IP Addressing and Routing in a Local Wireless Network", IEEE INFOCOM, Jun. 1992, vol. 2, pp. 626-632.

Droms, Ralph, "Automated Configuration of TCP/IP with DHCP", IEEE Internet Computing, Jul.-Aug. 1999, pp. 45-53.

Khan, Farook et al., "Multilevel Channel Assignment (MCA) for Wireless Personal Communications", IEEE, Apr. 5, 1997, pp. 1258-1262.

Noerpel, Anthony R. et al., "PACS: Personal Access Communications System—A Tutorial", IEEE Personal Communications, Jun. 1996, pp. 32-43.

Ryu, Bo et al., "Managing IP Services over a PACS Packet Network", IEEE Network, Jul./Aug. 1998, pp. 4-10.

* cited by examiner

DISTRIBUTIVELY ROUTED VDSL AND HIGH-SPEED INFORMATION PACKETS

CROSS-REFERENCE TO RELATED APPLICATIONS

This application claims the benefit of U.S. Provisional Application No. 60/152,730 filed Sep. 8, 1999, titled "Cellularized Packetized Voice and Data," the specification of which is expressly incorporated herein by reference in its entirety. This application is a continuation-in-part of a U.S. patent application Ser. No. 09/505,271 titled "Cellularized Packetized Voice and Data" to Dougherty et al. filed Feb. 16, 2000 now U.S. Pat. No. 7,388,846, which claims the benefit of the above-mentioned provisional application and which is expressly incorporated herein by reference in its entirety. This application claims the benefit of a U.S. Provisional Application No. 60/185,788 filed Feb. 29, 2000, titled "High Speed Distributed Wireless Communication," the specification of which is expressly incorporated herein by reference in its entirety.

TECHNICAL FIELD

The present invention relates to high-speed routing and delivery of information packets.

BACKGROUND ART

Communication systems are increasingly being required to provide a wide range of services, including different forms of information communicated and different communication characteristics. Information forms include voice, data, video, telemetry, and the like. Communication characteristics include quality, latency, reliability, cost, availability, portability, and the like. Infrastructure such as telecommunication systems, the Internet, and cable systems exist to provide long-haul routing and information content sourcing. However, difficulty remains in delivering this information to customers. This is particularly the case if the customer is located in a rural location, is communicating through portable equipment, or is mobile.

Traditionally, communication service providers have relied on copper wire or coaxial cable to connect distribution sites and subscriber premises. However, increases in the number of users, number and type of communication devices per user, and the information rate per device has strained the ability for traditional communication systems to provide the necessary bandwidth and flexibility. Various technologies including digital subscriber line (DSL) and video modems offer broadband access to the subscriber over existing copper or coaxial loop technologies. Fiber-to-the-home offers broadband access through additional wireline connections. While each technology has broadband delivery properties, each is subject to physical and signaling limitations that restrict availability in certain locations and for certain applications.

A promising technology is very-high-data-rate DSL (VDSL). A typical installation implements a hybrid local loop. Information packets are received and routed by a central office using ATM virtual circuits. The packets are sent from the central office over fiber-to-the-neighborhood (FTTN) to local optical network units (ONUS). Each ONU is connects to several customer premises over copper, such as unshielded twisted pair (UTP). A network interface device (NID) on the customer premises may format the information for customer premises equipment and isolate the customer premises from the VDSL network.

VDSL services may be symmetric or asymmetric. For example, downstream rates to the subscriber are typically 51.84 Mbps for UTP loops of 300 meters, 25.92 Mbps at 1,000 meters, and 12.95 Mbps at 1,500 meters. Upstream rates may fall into three classes, 1.6-2.3 Mbps, 19.2 Mbps, or equal to the downstream rate if permitted by class of service and available bandwidth.

There are several problems with current VDSL installations. First, since all packet routing takes place at a central office, the central office is a critical component to the system. If the central office fails, the entire area covered by the central office is without service. Further, the central office may become a bottleneck limiting the number of customers within the area that may be provided with VDSL service.

A second problem with current VDSL installations is the lack of ability to service all customers supported by the central office. Central offices are geographically located based on providing standard telephone services (POTS). In heavily populated areas, the coverage area of each central office may include more potential VDSL customers than the central office can support. In sparsely populated areas, potential VDSL customers are located at too great a distance from the central office to make VDSL services economically feasible.

A third problem with current VDSL installations is the ability to provide customers with a predictable level of service. The length, type, gauge, and quality of copper cabling connecting a VDSL customer and the central office is the predominant factor in determining the information rate available to the customer. Often, the copper loop was designed for only POTS service. Unshielded cable is typical. Wire of different gauges along the loop is not uncommon. Further, unterminated bridged taps are often spliced into the loop to increase the flexibility of the copper plant. Hence, neither the customer nor the service provider often knows the ultimate performance level until after the VDSL connection is made and tested.

Another promising technology is broadband delivery for video signals. A central office receives or generates video information for distribution to subscribers. This central office may be the same central office used for VDSL and POTS services or may be a separate central office for a given geographic area. The central office routes the video information to video distribution centers (VDCs) over distribution lines. Each VDC serves subscribers in a subset of the geographic area covered by the central office. Customer premises may be connected to the VDC over twisted pair, fiber or, more commonly, coaxial cable. Video signals may be received by a set-top box, a gateway, a decoder or transmitter incorporated into the receiver, or the like. Video signals may be broadcast from the central office, with each channel occupying bandwidth in the distribution line at all times. Video signals may also be switched, with only those signals requested by a subscriber being transmitted on the distribution line.

Many problems with video distribution networks are similar to difficulties experienced by VDSL systems. The central office presents both a critical component and a potential bottleneck. Because video distribution networks were typically designed for one-way distribution of video signals, they provide highly asymmetrical communication paths. Also, customer equipment designed for video display is often incompatible with digital data equipment.

What is needed is a communication system that provides high-speed information access for VDSL services, video signals, and the like. The system should make efficient use of bandwidth, allocating only the bandwidth necessary for a particular communication. The system should be flexible, permitting automatic addition and deletion of network components. The system should have distributed routing and service provisioning to prevent bottlenecks, permit scaling, and increase reliability and robustness. The system should support wireless communication, accommodating a wide variety of fixed, portable, and mobile user communication devices. The system should support high-speed symmetric and asymmetric communication for applications such as Internet access, video conferencing, real-time distributed document sharing, video-on-demand, and the like.

DISCLOSURE OF INVENTION

The present invention provides a distributed network for high-speed communication and information access. A wide variety of services can be supported, including VDSL, video distribution, audio distribution, conferencing, public service announcements, gaming, and the like. Various distribution formats are also supported, including fiber, hybrid, and wireless interconnectivity.

In one embodiment, high-speed information is provided through a distributed network of distribution points. Each packet destined for a subscriber unit is provided with an address indicating a destination within the communication system. In each distribution point along the path to the destination, a determination is made as to which distribution point each packet will be forwarded based on the address. Each packet is received in an access point servicing the destination, and the packet is forwarded to the destination subscriber unit.

In various configurations, packets are transmitted within the network of distribution points over wireless links, packets are received in an access point over a wireless link, and packets are forwarded to the destination subscriber unit over a wireless link between the access point and the subscriber unit.

In an embodiment of the present invention, the last distribution point in the path of distribution points includes a host digital terminal transmitting packets over optical fiber. The access point may include an optical network unit receiving packets over optical fiber and distributing packets to each subscriber unit over a digital subscriber loop.

A method of distributing high-speed information packets wherein each information packet is associated with an information channel is also provided. Each information packet is routed through a distributed network of routing elements, each routing element in wireless communication with at least one other routing element. Each information packet is received in a distribution center connected to the network of routing elements. Each information packet is then forwarded to each subscriber unit requesting the information channel of which the information packet is associated.

In an embodiment of the present invention, a request is received from a subscriber unit to access an information channel. Receiving a request from a subscriber unit may include determining that the requesting subscriber unit is within the coverage area of a distribution center or receiving a message requesting access from a subscriber unit. Transmission of the requested information channel is requested if no other subscriber unit is receiving the requested information channel. A notation is made that the requesting subscriber unit is receiving the requested information channel. The method may also include determining that a subscriber unit is no longer accessing the information channel. Transmission of the information channel is cancelled if no other subscriber unit is receiving the information channel. A notation is made that the subscriber unit is no longer receiving the information channel.

In an embodiment of the present invention, the distributed network of routing elements includes a distributed network of distribution points and access points communicating with subscriber units. Either or both of the distribution points and access points may be functioning as distribution centers.

A system for providing high-speed packetized information is disclosed. A distributed routing network has a plurality of distribution points in radio contact. At least one of the distribution points includes at least one host digital terminal (HDT) for converting high-speed information packets to an optical format and forwarding the information packets to subscriber units.

A system for providing packetized video information to a plurality of subscriber units is also disclosed. A distributed routing network has a plurality of distribution points in radio contact. In one embodiment, at least one of the distribution points functions as a video distribution center. In another embodiment, at least one access point in communication with the routing network functions as a video distribution center.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
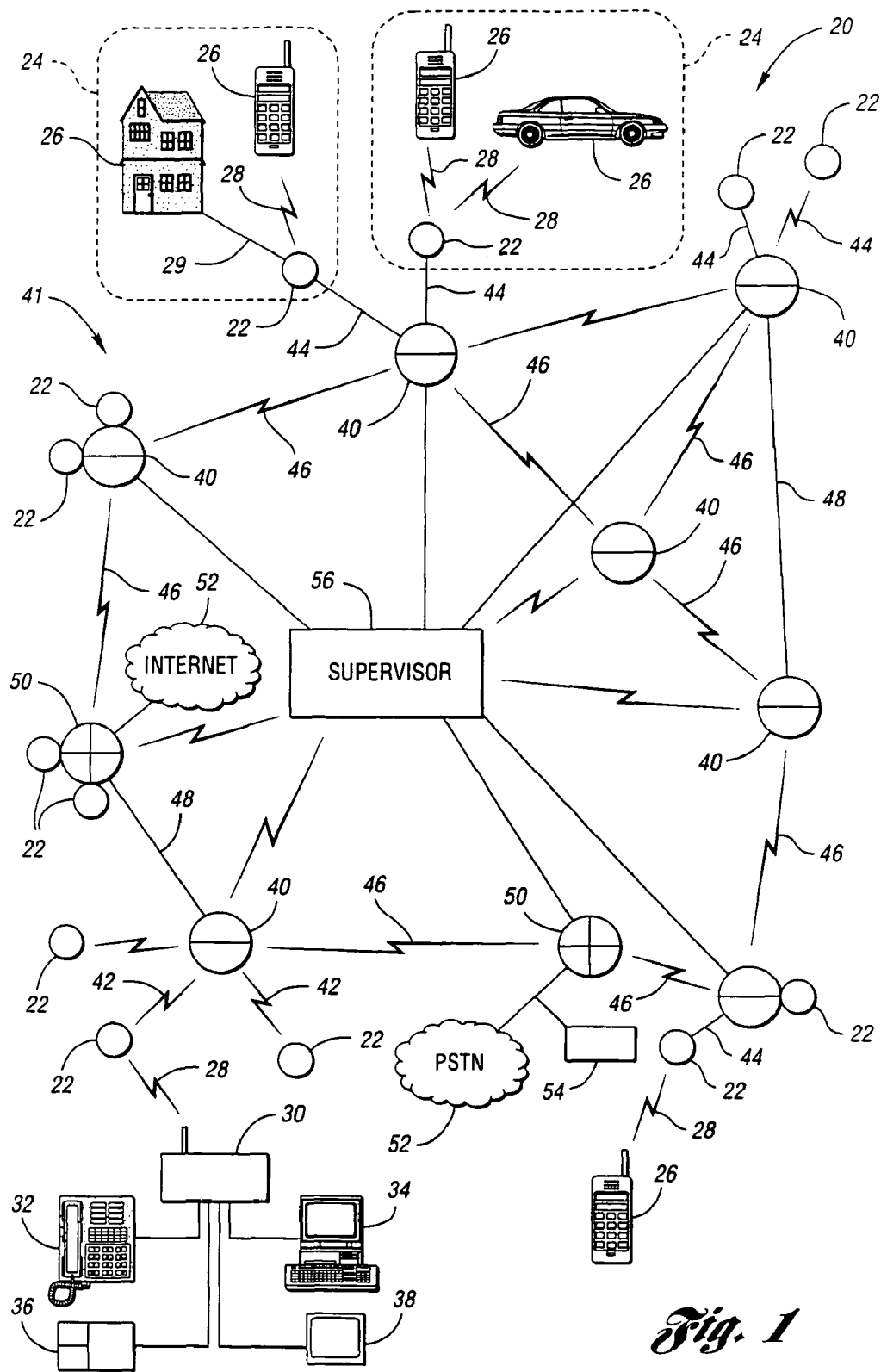
FIG. 1 is a schematic drawing illustrating a portion of a communication system according to an embodiment of the present invention.

Referring to FIG. 1, a schematic drawing illustrating a portion of a communication system according to an embodiment of the present invention is shown. A communication system, shown generally by 20, includes a plurality of access points 22 which may be, for example, a local radio access point (LRAP). Each access point 22 defines coverage area 24 such as, for example, a cell, covering a reception range of access point 22. Coverage area 24 may be formed from many independent sectors, as may result if access point 22 uses many unidirectional antennas, or may be a single region resulting from the use of an omnidirectional antenna. Subscriber unit 26 within coverage area 24 may establish two-way wireless link 28 with access point 22. Subscriber unit 26 may also establish wireline link 29 with access point 22. Links 28, 29 may be symmetrical or asymmetrical. Subscriber unit 26 may be fixed or non-fixed and, if non-fixed, may posses varying degrees of portability and mobility. Subscriber unit 26 may be a mobile telephone, a computer, a video receiver, an audio receiver, a two-way video conferencing station, a video game, an information kiosk, a remote sensor, a remote actuator, or any other suitable communication device.

Wireless link 28 may be any form of electromagnetic signaling not confined to a wire or cable, including energy radiated by antenna as well as visible and invisible light. As will be appreciated by one of ordinary skill in the art, wireless link 28 may be implemented by any access technology, including CDMA, TDMA, FDMA, OFDM, analog, and the like. Modulation techniques that may be used with the present invention include FSK, BPSK, QPSK, m-ary QAM, FM, AM, and the like. Further, the invention does not depend on modulation frequency or on the use of FDD or TDD. In a preferred embodiment, the access technology, frequency, and modulation method for establishing wireless link 28 are based, in part, on local geography, local regulations, noise and distortion sources, other operating wireless systems, cost, or any other suitable parameter. Subscriber unit 26 and access point 22 may establish wireless link 28 using a plurality of combinations of access technology, frequency, and modulation techniques.

Information transmitted on links 28, 29 may represent voice, data, video, streaming audio, streaming video, or the like. Types of information include speech, facsimile, computer data, entertainment and informational audio and video, video game data, telemetry information, security information, and the like. If the information occurs as a continuous stream, subscriber unit 26 breaks the information into packets prior to packet transmission and reassembles the information stream from packets after packet reception. Any type of information that exists in packets or that may be packetized can be used with the present invention.

In an embodiment of the present invention, subscriber unit 26 may be implemented as part of terminal network controller 30 accepting inputs from and providing outputs to information sources including voice equipment 32, computing equipment 34, telemetry equipment 36, video equipment 38, or any other suitable communication equipment. Inputs to terminal network controller 30 may include serial data, parallel data, ISDN, standard telephone, xDSL, SR 1394, coaxial cable, twisted pair cable, optical fiber, or any other suitable communication protocol, method, or medium.

In an embodiment of the present invention, a quality error bit rate is established for each subscriber unit 26. This quality error bit rate may be based on the location of subscriber unit 26 within communication system 20, the class of service assigned to subscriber unit 26, the grade of service assigned to subscriber unit 26, the data or transmission rate of service assigned to subscriber unit 26, or any other suitable parameter. The quality error bit rate may be modified while subscriber unit 26 is within communication system 20 to reflect changing conditions such as noise, demand, connectivity, or any other suitable parameter. Applications providing services to subscriber unit 26 may adjust these services based on the quality error bit rate. For example, an application providing streaming audio and video may reduce the frame update rate as noise increases, guaranteeing successful transmission at a lower information rate. The information rate may be further reduced to provide only still pictures and audio if conditions continue to worsen. The information rate may also be automatically changed if subscriber unit 26 moves between coverage areas 24 with differing transmission capabilities or loads.

Control of the information rate may be achieved by having subscriber unit 26 monitor a signaling channel transmitted by access point 22 for each coverage area 24. This signaling channel informs subscriber unit 26 when to transmit information, how much information to transmit, the information transmission rate, and the like. The signaling channel may be controlled by a central supervisor, described below.

In an embodiment of the present invention, bandwidth on communication link 28 is only consumed when packets containing information are transmitted. For example, each subscriber unit 26 surrenders bandwidth on communication link 28 when not sending or receiving an information packet. Packets to be transmitted are queued based on order of arrival, priority, a combination of arrival order and priority, or the like. Subscriber unit 26 monitors a signaling channel transmitted by access point 22 for each coverage area 24. Subscriber unit 26 only consumes bandwidth when instructed to transmit by the signaling channel or when receiving packets.

Each access point 22 communicates with at least one distribution point 40. Distribution point 40 contains both routing and switching functionality. Access point 22 may be in contact with one or more radio access distribution points 40 over radio link 42, may be wired or cabled to distribution point 40 through wireline link 44, or may be packaged with distribution point 40. Access point 22 may also be transformed into distribution point 40, permitting access point 22 to route traffic that neither originated nor terminated with any of its serviced subscriber units 26. Distribution point 40 is in communication with at least one additional distribution point 40, the collection of interconnected distribution points forming a network of distribution points, shown generally by 41. Two distribution points may be connected by radio link 46 or wireline link 48.

Distribution points 40 may route packets within distribution point network 41 under a variety of protocols such as ATM, TCP/IP, 802.x, or the like. In a preferred embodiment, distribution point 40 includes an ATM/IP switch. Distribution point 40 then operates at both the IP routing and ATM switching layers or, in terms of the Open Systems Interconnection (OSI) standard, at both the network layer and the data link layer.

The IP layer operates with a link-state protocol such as the open shortest path first (OSPF), quality OSPF (Q-OSPF), or internal gateway routing protocol (IGRP) and its derivatives. The IP layer operates as a single autonomous system (AS) within the IP frame of reference. Each system 20 will be allocated a unique and unambiguous AS number for system management. IP addresses for system 20 will use a private IP address space that cannot be routed within public systems such as the Internet. Subscriber units 26 within system 20 may be permitted access to the private IP address space or may be excluded from the private IP address space. When private IP address space is used for subscriber units 26, a network address translator (NAT) within system 20 allows subscriber units 26 access to the Internet. The ATM layer operates with the private network node interface (PNNI) routing protocol. ATM end system addresses (AESAs), managed by the service provider for system 20, are used by distribution point network 41.

The ATM network carries voice traffic and may carry data. Through PNNI, the ATM/IP switch participates in switched or signaled virtual connections (SVCs). When subscriber unit 26 within system 20 requires voice connectivity, it signals such a request, which is serviced by distribution point 40 receiving that request. The IP network coresiding with the ATM network is used for delay insensitive data applications required by subscriber units 26. The IP network is also used for all network management, including management of ATM/IP switches, subscriber units 26, gear associated with distribution points 40, and any other suitable network component. This includes functions such as alarming, monitoring, recovery systems, and the like. While described in the context of a wireless network application, it is readily apparent that ATM/IP routing as described herein may be applied to wireline and mixed wireline-wireless systems as well.

Each distribution point 40 receives an information packet from either another distribution point 40, from subscriber unit 26 in communication with distribution point 40 through access point 22, or from an external communication system. If distribution point 40 determines the information packet is destined for subscriber unit 26 within coverage area 24 of access point 22 in communication with distribution point 40, distribution point 40 forwards the packet to access point 22 forming coverage area 24 containing destination subscriber unit 26. If distribution point 40 determines the information packet is destined for subscriber unit 26 in coverage area 24 formed by access point 22 in communication with a different distribution point 40, distribution point 40 forwards the packet to one of distribution points 40 in communication with distribution point 40. Hence, no central MSC is required for routing. Distributed routing removes delays caused by central switching, increases the robustness of the communication system 20, increases network efficiency, and permits simplified expansion or reduction of communication system 20 by automatically adding or removing distribution points 40.

A third option is that distribution point 40 determines that the information packet is destined for a destination not part of communication system 20. Special distribution points, such as gateway 50, provide a bridge to additional communication systems 52 including wireless and wireline telecommunication systems, video distribution systems, computer network systems such as the Internet, packet systems, frame systems, ATM systems, IP systems, private networks, and any other suitable communication or information system. If distribution point 40 determines the information packet is destined for delivery outside of communication system 20, distribution point 40 forwards the packet to one of distribution points 40 in communication with gateway 50.

In an embodiment of the present invention, communication system 20 includes communication system interface device 54 operative to format information contained in the information packet to pass through telecommunication system 52. Communication system interface device 54 may be incorporated into gateway 50 or may be a separate component of communication system 20. Distribution point 40 receives at least one information packet from the telecommunication system interface device 54 and determines if the at least one information packet destination is to subscriber unit 26 within coverage area 24 of access point 22 in communication with distribution point 40. Distribution point 40 forwards the at least one information packet to access point 22 defining coverage area 24 containing subscriber unit 26 if the information packet destination is to subscriber unit 26 within coverage area 24 of access point 22 in communication with distribution point 40 and forwards the at least one information packet to one of the additional distribution points 40 in communication with distribution point 40 otherwise.

Each distribution point 40 communicates with supervisor 56. Supervisor 56 tracks the locations of subscriber units 26 within communication system 20, identifying with which distribution point 40 each subscriber unit 26 is currently communicating. Supervisor 56 manages transmission priorities based on parameters including load, information type, service requests, location, grade of service, information transfer rates, or any other suitable parameter. Supervisor 56 may also serve as a collection point for alarms and performance measuring of communication system 20. Supervisor 56 may further include or interface with billing and authentication services.

In an embodiment of the present invention, supervisor 56 also assigns an address to each distribution point 40 as distribution point 40 is added to communication system 20. Supervisor 56 provides each distribution point 40 with a logical address and a listing indicating to which additional distribution point 40 in communication with distribution point 40 information packets should be forwarded for each possible destination distribution point 40. The listing may be based on maintaining a minimum quality of service in the path through distribution point network 41 to the destination distribution point 40. Supervisor 56 periodically assesses the performance of network 41 by sending test messages. Reports may also be generated by distribution points 40 attempting to communicate with target addresses.

Supervisor 56 is shown in FIG. 1 as a separate component individually connected to each distribution point 40. Alternatively, communication between supervisor 56 and distribution points 40 may be through radio links 46 and wireline links 48. Supervisor 56 may be one or more separate components of communication system 20, may be incorporated into one of distribution points 40, or may be distributed amongst multiple distribution points 40.

In an embodiment of the present invention, a distribution point may be automatically added to or removed from distribution point network 41. When new distribution point 40 is first inserted into communication system 20, new distribution point 40 transmits a signature signal. Existing distribution points 40 within range of new distribution point 40 receive the signal and report it to supervisor 56. Supervisor 56 then determines if new distribution point 40 will be added to network 41. If so, supervisor 56 assigns new distribution point 40 a routing address and informs network 41 as needed. Each existing distribution point 40 in distribution point network 41 is provided with an indication as to which distribution point 40 in communication with existing distribution point 40 each information packet having a destination address specifying the new distribution point 40 is to be forwarded. If a distribution point 40 is removed from network 41, remaining distribution points 41 report the absence of removed distribution point 40 to supervisor 56. Supervisor 56 then informs network 41 as needed.

In an embodiment of the present invention, each subscriber unit 26 is autonomously registered with communication system 20 when subscriber unit 26 first enters coverage area 24 within communication system 20. Each subscriber unit 26 maintains registration as subscriber unit 26 moves from one coverage area 24 into another coverage area 24 within communication system 20 and is autonomously deregistered when subscriber unit 26 leaves communication system 20. To accomplish automatic registration and deregistration of subscriber units 26, each access point 22 periodically reports the status of subscriber units 26 within any controlled coverage area 24 to supervisor 56 performing registration and authentication. Each access point 22 communicates with subscriber units 26 to determine status. When a subscriber unit 26 voluntarily enters or leaves coverage area 24, such as by powering up or down, subscriber unit 26 transmits a particular signal to access point 22. Information is also received from subscriber unit 26 in response to periodic queries from network 20. Access point 22 may determine the absence of subscriber unit 26 from coverage area 24 if no communication is received after a particular time interval. Algorithms for registering and deregistering subscriber units 26 may be based on various factors including quality of service, traffic, location, service type, network topology, and the like.

Figure 2:
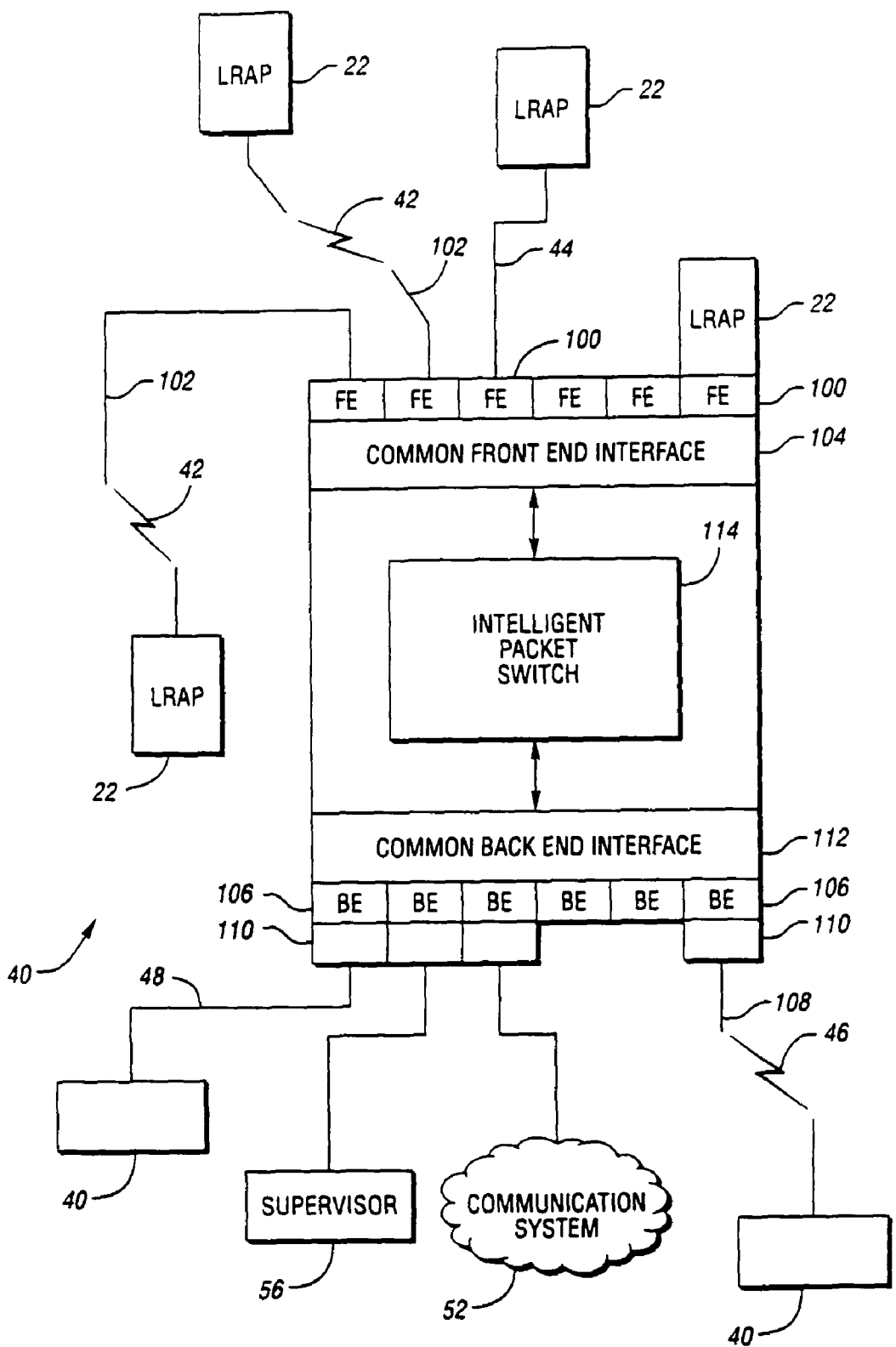
FIG. 2 is a block diagram of a distribution point according to an embodiment of the present invention.

Referring now to FIG. 2, a block diagram of a distribution point according to an embodiment of the present invention is shown. Distribution point 40 includes one or more front end communication interfaces 100, each front end interface communicating with one access point 22. In one configuration, access point 22 is packaged with distribution point 40. Front end interface 100 may provide a plug-in port for receiving access point 22. In another configuration, front end interface 100 connects to antenna 102 for establishing radio link 42 with access point 22. In a further configuration, front end interface 100 accepts wireline link 44 connecting distribution point 40 with access point 22. Front end interface 100 operates using a standard packet switching protocol such as, for example, ATM25. Each front end communication interface 100 passes information packets through common front end switch interface 104 operating under a packet protocol such as ATM, TCP/IP, 802.x, or the like.

Distribution point 40 also includes back end communication interfaces 106 for connecting distribution point 40 with additional distribution points 40, with supervisor 56, and, if distribution point 40 is a gateway 50, with telecommunication systems, private network systems, video distribution systems, the Internet, or the like. This may be typically referred to as back haul communication. In one configuration of the present invention, back end interface 106 connects to antenna 108 for establishing radio link 46 with another distribution point 40. In another configuration, back end interface 104 accepts wireline link 44 connecting distribution point 40 with another distribution point 40. In a preferred embodiment, back end interface 106 accepts modules 110 for interfacing through a variety of protocols and media such as ATM25, DS1, DS3, OC3, 1000 Base-T, 100 Base-T, and the like. Each back end communication interface 106 passes information packets through common back end switch interface 112 operating under a packet protocol such as ATM, TCP/IP, or the like. In a preferred embodiment, distribution point 40 dynamically allocates bandwidth when the information packet is forwarded to one of the additional distribution points 40 in communication with distribution point 40.

Intelligent packet switch 114 received information packets through common front end switch interface 104 and common back end switch interface 112 and routes the packets between front end interfaces 100 and back end communication interfaces 106. Switch 114 may be a packet switching device as is known in the art such as an ATM switch, an IP switch, a TDM switch, a switch working under the 802.11 specification, or any other suitable alternative or combination having the required switching functionality. In an embodiment of the present invention, switch 114 includes an ATM portion for routing voice, video and data, and an IP portion for real-time dynamic data routing and non-real time data routing as well as administration, management, and network topology control.

In an embodiment of the present invention, distribution point 40 is enclosed in an environmentally sealed package. This permits distribution point 40 to be mounted outside, such as on a pole or the side of a building. In keeping with the invention, however, distribution point 40 need not be outside so long as it can communicate with access points 22, additional distribution points 40, supervisor 56, and any other suitable network component.

Figure 3:
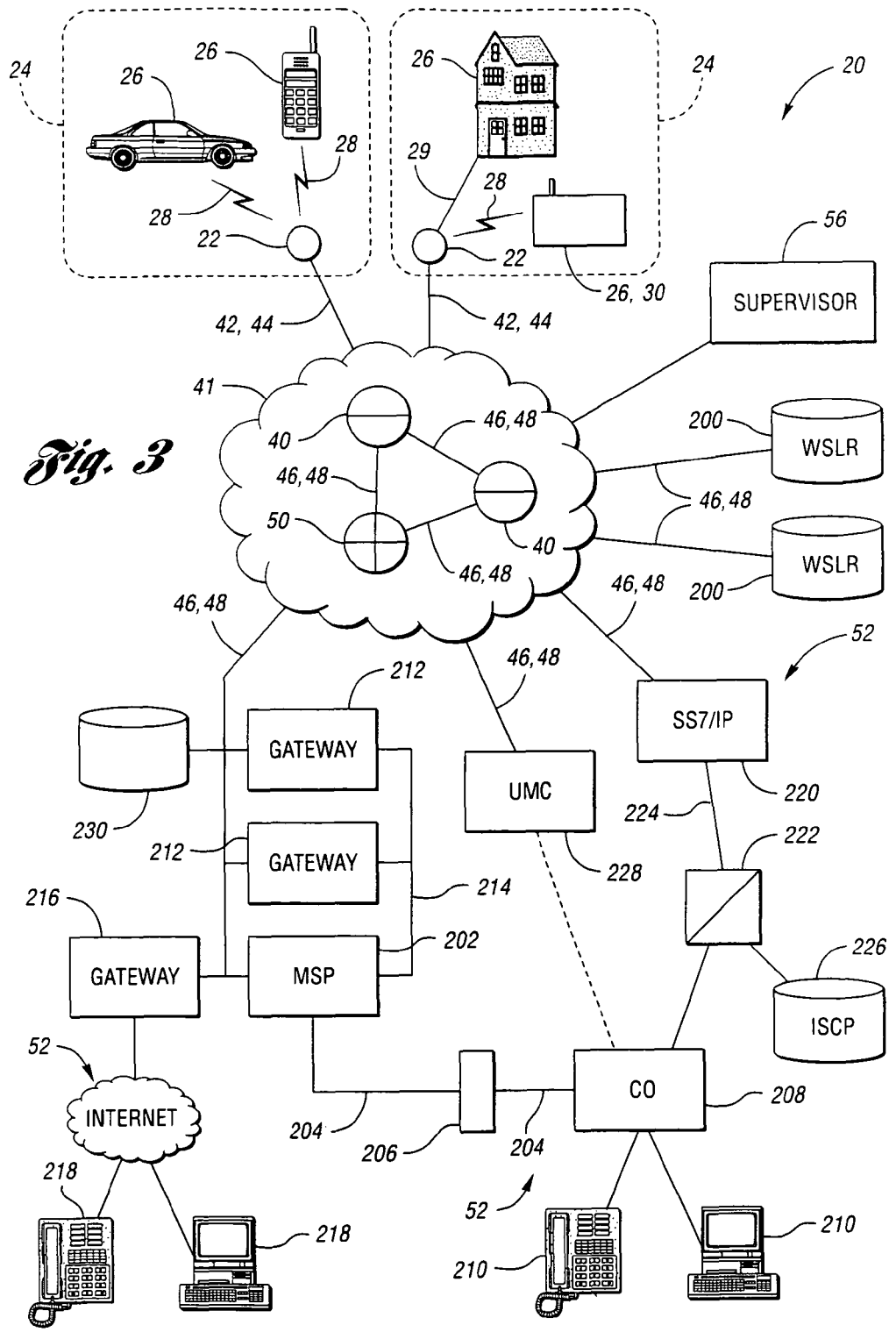
FIG. 3 is a schematic drawing illustrating an implementation of a communication system according to an embodiment of the present invention.

Referring now to FIG. 3, a schematic drawing illustrating an implementation of a communication system according to an embodiment of the present invention is shown. This implementation provides an example including interfaces between communication system 20 and a variety of external communication systems 52.

Communication system 20 includes wireless service location registers (WSLRs) 200 providing common subscriber and service databases. Each WSLR 200 communicates with at least one distribution point 40 and one additional communication system 52. Connections between WSLRs 200 and communication systems 52 are not shown in FIG. 3 for clarity. Each WSLR 200 provisions requested services from additional communication system 52. For example, WSLR 200 may provide centralized mobility and location management. Supervisor 56 determines which WSLR 200 will provision services based on the distribution point 40 through which subscriber unit 26 requesting services is currently communicating. A device that may serve as WSLR 200 is described in U.S. Pat. No. 5,974,331 titled "Method And System For Dynamically Assigning Features And Users To Wireline Interfaces," to Cook et al., which is herein incorporated by reference. Call agents may also function as WSLR-like devices to map or integrate additional communication systems with system 20.

Communication system 20 may also include multi-service platform (MSP) 202. MSP 202 provides access to wireline telephone systems (PSTN). This may be accomplished through GR-303 compliant connection 204. Signaling point of interface (SPOI) 206 serves as the demarcation point between communication system 20 and external communication system 52. In the example shown, GR-303 connection 204 connects wireline provider 208, serving wired customers 210, with communication system 20. MSP 202 may integrate both PSTN and IP networks as well as provide enhanced circuit/packet switch services.

At least one gateway 212 supports MSP 202. Communication system 20 may include, for example, voice-over-ATM (VoATM) to GR-303 gateways and voice over IP (VoIP) to GR-303 gateways. Gateway 212 serves as a protocol agent, converting information packets to a format acceptable to additional communication system 52. A determination as to which gateway 212 will process an information packet may be based on information contained within the information packet. Gateways 212 may be connected to MSP 202 by GR-303 compliant connection 214.

Communication system 20 may also include gateway 216 connecting communication system 20 with external data network 52 such as the Internet or a private data network interconnecting network users 218. Gateway 216 may, for example, convert between various packet-based standards such as H.323 and SIP.

Communication system 20 may also include gateway 220 interfacing communication system 20 with external SS7 network 52 represented by signal transfer point (STP) 222. Gateway 220 communicates with STP 222 through ISUP compliant connection 224 which permits setting up and taking down trunk calls, calling party information services, call status, and any other suitable network function, by passing signaling information through SS7 network 52 to wireline provider 208 under the control of integrated services control point (ISCP) 226.

Communication system 20 may also include unified message center (UMC) 228. Unified messages, also known as integrated messages, permit messages from a variety of sources such as telephone, email, fax, reports, compound documents, or any other suitable information or communication device, to be summarized and presented on a single medium, such as a personal computer. Messages may even be translated from one media type to another. UMC 228 supports unified message applications within communication system 20. In an embodiment, UMC 228 communicates with wireline provider 208, permitting greater integration, flexibility and access to messages.

Connection controller 230 controls access to gateways 50, 202, 212, 216, 220, or any other suitable interface. For example, connection controller 230 may manage voice over ATM to GR-303 access, voice over IP to GR-303 access, H.323/SIP to Internet remote access, SS7 to IP access, and the like. Connection controller 230 may also support information rate adaptation including open application processor interfaces and robust application development platforms.

Figure 4:
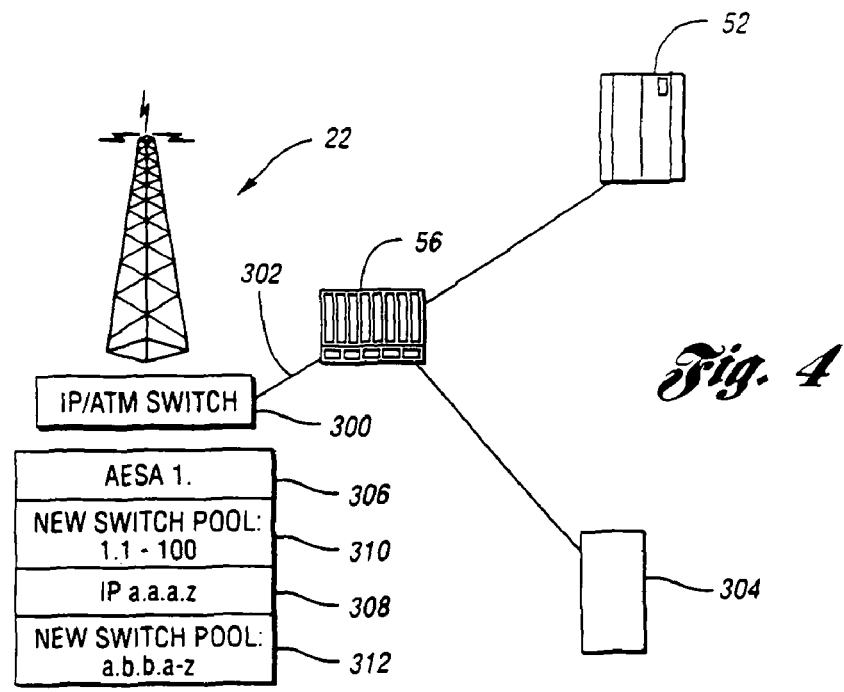
FIG. 4 is a schematic drawing illustrating an initial state for a communication system according to an embodiment of the present invention.
Figure 5:
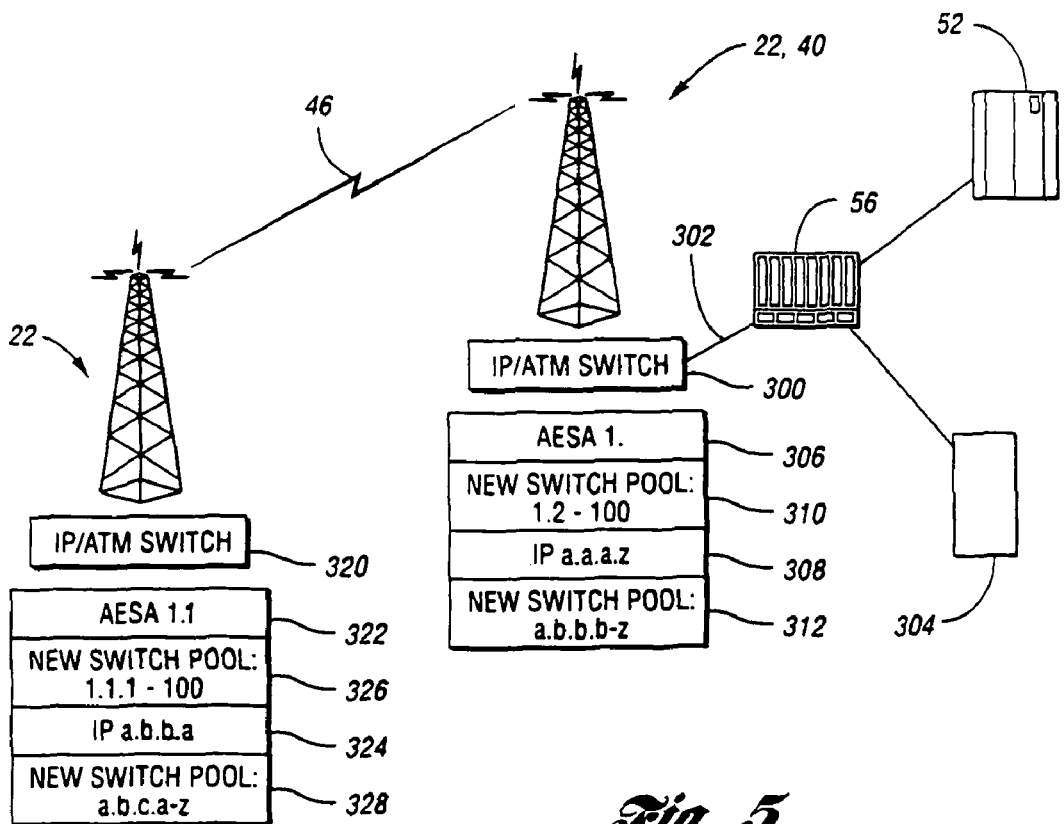
FIG. 5 is a schematic drawing illustrating the addition of a second access point to the communication system of FIG. 4 according to an embodiment of the present invention.
Figure 6:
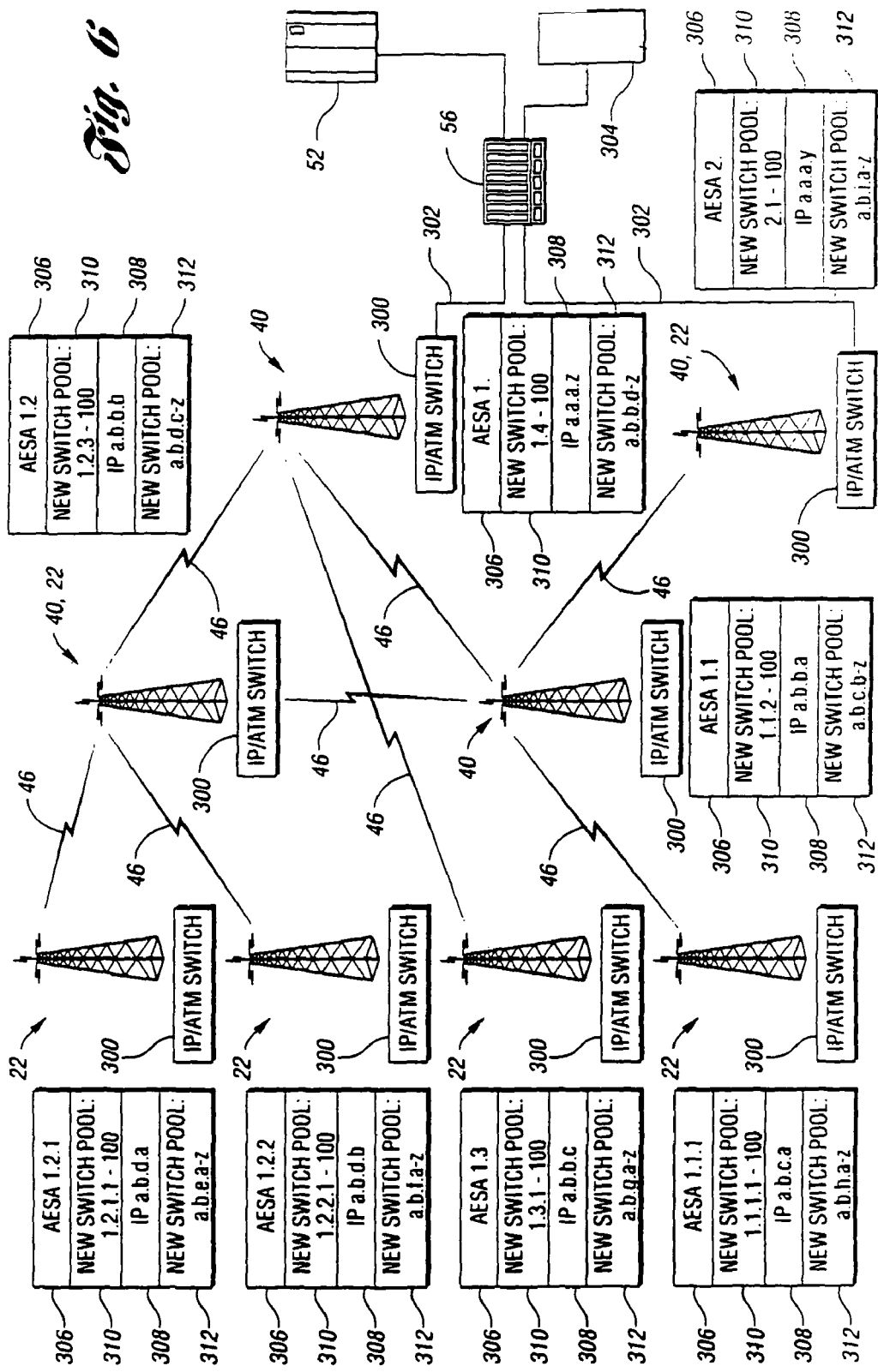
FIG. 6 is a schematic drawing illustrating a hierarchical routing system using ATM/IP switches according to an embodiment of the present invention.

Referring now to FIGS. 4-6, drawings illustrating dynamic growth of a distribution point network according to an embodiment of the present invention are shown. An initial configuration for system 20 is shown in FIG. 4. ATM/IP switch 300 is in communication with supervisor 56 through ATM virtual connection 302. In this simple configuration, ATM/IP switch 300 may be functioning as access point 22. ATM/IP switch 300 may obtain an IP address and an ATM address either manually or automatically.

ATM/IP switch 300 automatically requests addresses by first broadcasting an ATM request in an IP packet over virtual connection (VC) 302. Supervisor 56 forwards this request to address server 304. Address server 304 responds by allocating unique AESA 306 to the address assignment client in ATM/IP switch 300, which updates the ATM layer with new address 306. The address assignment client in ATM/IP switch 300 next requests from address server 304 an IP address, again using IP as the transport service over pre-existing ATM VC 302. Address server 304 forwards IP address 308 to ATM/IP switch 300. ATM/IP switch 300 then requests address pools for ATM and IP. Address server 304 responds by supplying AESA pool 310 and IP address pool 312. Pools of addresses 310, 312 are used by switch 300 when functioning as distribution point 40 in support of other distribution points 40 and access points 22.

Referring now to FIG. 5, a drawing illustrating the addition of a second access point is shown. Access point 22 has the capability to function as a distribution point 40. As new access points 22 are subtended from an existing access point 22, existing access point 22 becomes a distribution point 40. Each distribution point 40 continues to communicate with its initially connected distribution point 40 and with other distribution points 40 as they are provisioned. As new links 46, 48 between distribution points are created, distribution points 40 form peer relationships at both the ATM layer and the IP layer. Distribution points 40 are always peers at the IP and ATM layer, while access points 22 are clients of distribution points 40. As such, each ATM/IP switch 300 functions as a server when operating as distribution point 40 and as a client when operating as access point 22.

When new ATM/IP switch 320 is instantiated as access point 22, it will automatically request an ATM address in an IP packet address assignment request. This IP packet will be sent in an ATM frame over radio link 46 to IP/ATM switch 300 functioning as distribution point 40 using a pre-existing ATM VC. IP/ATM switch 300 will allocate unique ATM address 322 from AESA pool 310 and unique IP address 324 from IP address pool 312. ATM/IP switch 320 then sends a directed request to address server 304 and receives its own AESA pool 326 and IP address pool 328.

Referring now to FIG. 6, a hierarchical routing network is shown. Address server 304 assigns AESA pool 310 and IP address pool 312 as each ATM/IP switch 300 is added. By handling all requests for address pools 310, 312, address server 304 maintains a hierarchy of addresses for both ATM and IP layers. Address server 304 constructs routing tables for each ATM/IP switch 300 indicating to which directly connected ATM/IP switch 300 each incoming packet should be routed if the packet is not destined to subscriber unit 26 serviced by that ATM/IP switch 300. Thus, routing tables are cohesive, reflecting the view of communication system 20 seen by each ATM/IP switch 300. Address server 304 also constructs forward equivalency class (FEC) tables permitting ATM/IP switch 300 to route packages based on package contents. FECs can be seen as either the virtual path identifier (VPI) portion of the ATM VPI/VCI or as the entire VPI/VCI, and are enabled by the routing protocols at the IP and PNNI layers.

New routing elements are dynamically added to a network of routing elements by establishing a connection between the new routing element and an existing routing element in the network of routing elements. At least one address is assigned to the new routing element, each assigned address coming from a pool of addresses maintained at the existing routing element. At least one pool of addresses is issued to the new routing element. The one or more pool of addresses permitting the new routing element to dynamically add yet another new routing element to the network of routing elements.

In an embodiment of the present invention, a method of dynamically adding a routing element to a distributed communications includes establishing an ATM virtual connection with an existing distribution point already part of the communications network. An ATM end user address is requested from the existing distribution point. An ATM end user address is obtained from the existing distribution point, the ATM end user address allocated from a pool of ATM end user addresses in the existing distribution point. An IP address is requested from the existing distribution point. An IP address is obtained from the existing distribution point, the IP address allocated from a pool of IP addresses in the existing distribution point. Preferably, a pool of ATM end user addresses is requested and received from an address server. A pool of IP addresses is requested and received from the address server. An ATM end user address from the pool of ATM end user addresses and an IP address from the pool of IP addresses may be assigned to a new routing element requesting to be added to the communications network.

In an embodiment of the present invention, when a new distribution point is added to a network of distribution points, a connection is established between the new distribution point and at least one existing distribution point in the network of distribution points. A peer-to-peer relationship is formed at the OSI network layer between the new distribution point and the at least one existing distribution point. A peer-to-peer relationship is formed at the OSI data link layer between the new distribution point and the at least one existing distribution point.

In an embodiment of the present invention, when an access point is added to a network of distribution points, a connection is established between the access point and at least one existing distribution point in the network of distribution points. A client-server relationship is formed at the OSI network layer between the access point client and the at least one existing distribution point server. A client-server relationship is formed at the OSI data link layer between the access point and the at least one existing distribution point server.

In an embodiment of the present invention, when an ATM/IP switch 300 is removed from communication system 20, all of the addresses 306, 308 and address pools 310, 312 associated with the removed switch 300 are released. Addresses 306, 308 and address pools 310, 312 may be instantiated at distribution point 40 which originally supplied removed switch 300 with addresses 306, 308, may be sent to supervisor 56, or may be split with addresses 306, 308 returning to distribution point 40 and address pools 310, 312 returning to supervisor 56.

When subscriber unit 26 first enters communication system 20, it is detected and serviced by access point 22. Subscriber unit 26 is provided with one or more addresses, each address routable within at least the local hierarchy of ATM/IP switches 300. If subscriber unit 26 enters the range of a new access point 22, new access point 22 sends out a flooding FEC routing update for the ATM address of subscriber unit 26. Previously servicing access point 22 removes subscriber unit 26 from its own FEC upon receiving the FEC update. Any subsequent ATM packets received by previously servicing access point 22 are discarded.

When subscriber unit 26 changes access points 22, the IP routing portion of system 20 moves the IP address of subscriber unit 26 from one FEC class to another. Any IP packets remain untouched, with only a label or equivalence changed. In one embodiment, the label is the VPI portion of the VC. In another embodiment, multiprotocol label switching (MPLS) is used to provide an additional label. In either case, the IP address and virtual connection identifier (VCI) are retained.

Figure 7:
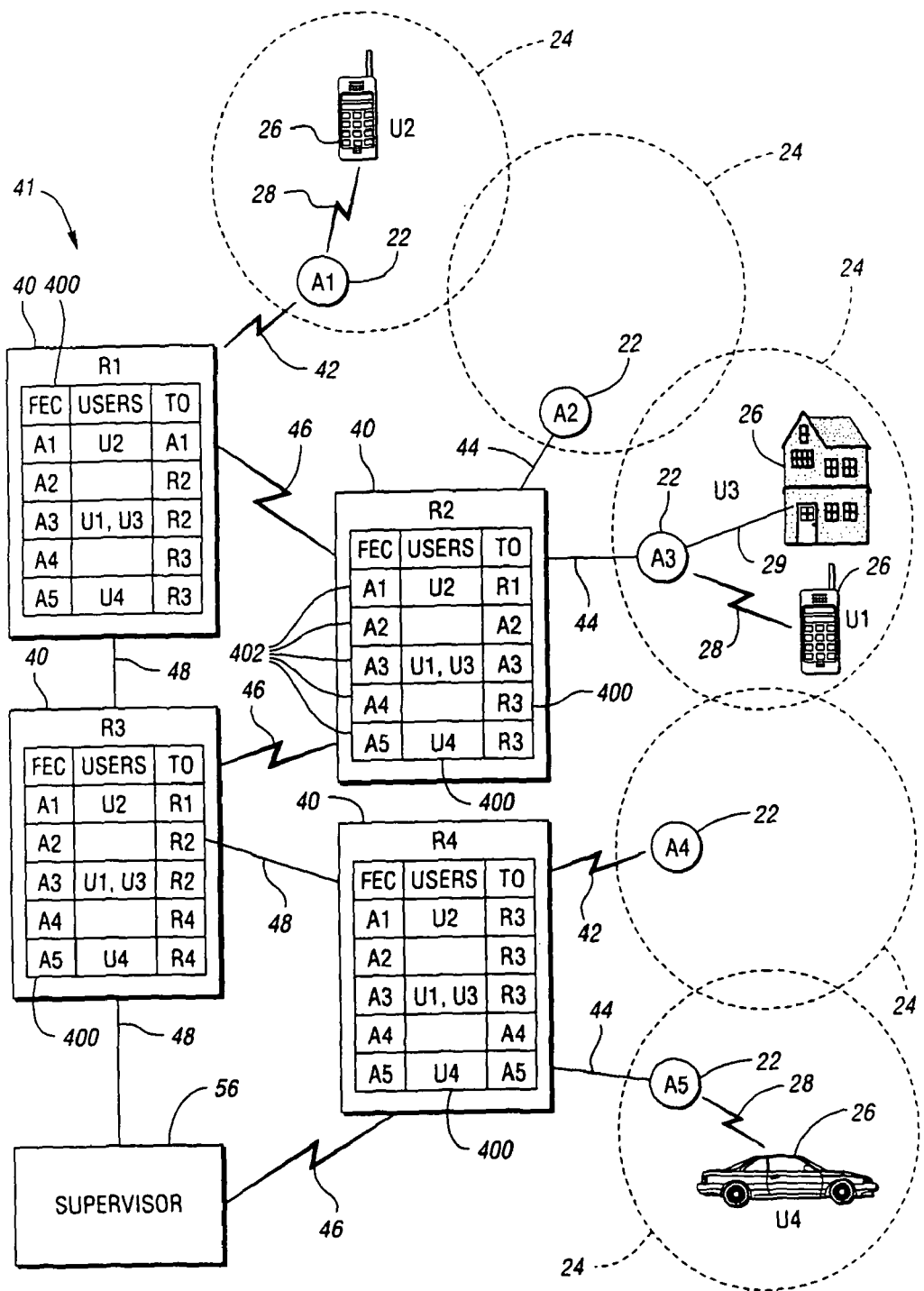
FIG. 7 is a schematic drawing illustrating a network of distribution points routing packets based on forward equivalency classes according to an embodiment of the present invention.

Referring now to FIG. 7, a schematic drawing illustrating a network of distribution points routing packets based on forwarding equivalency classes is shown. Each distribution point contains an FEC table 400 used to route packets received from and destined to subscriber units 26. Forwarding equivalency class table 400 contains one entry for each forwarding equivalency class 402. In the embodiment shown, there is one FEC 402 corresponding to each access point 22. When subscriber unit 26 is first detected by access point 22, the address for subscriber unit 22 is placed in the equivalency class 402 corresponding to the detecting access point 22. The address is typically an IP address. This may be done by broadcasting from detecting access point 22 or, preferably, is done by supervisor 56 after supervisor 56 receives a message indicating subscriber unit 26 has been detected by access point 22.

FEC table 400 in each distribution point 40 contains the next destination for each FEC 402. Typically, destinations are other distribution points 40, access points 22 serviced by distribution point 40, gateways 50, and other suitable points for routing, switching, servicing, distributing, and the like. When a packet destined for subscriber unit 26 is received by distribution point 40, distribution point 40 determines to which FEC subscriber unit 26 is assigned, determines to which destination the packets in that FEC are routed, and forwards the packet to the determined destination.

Figure 8:
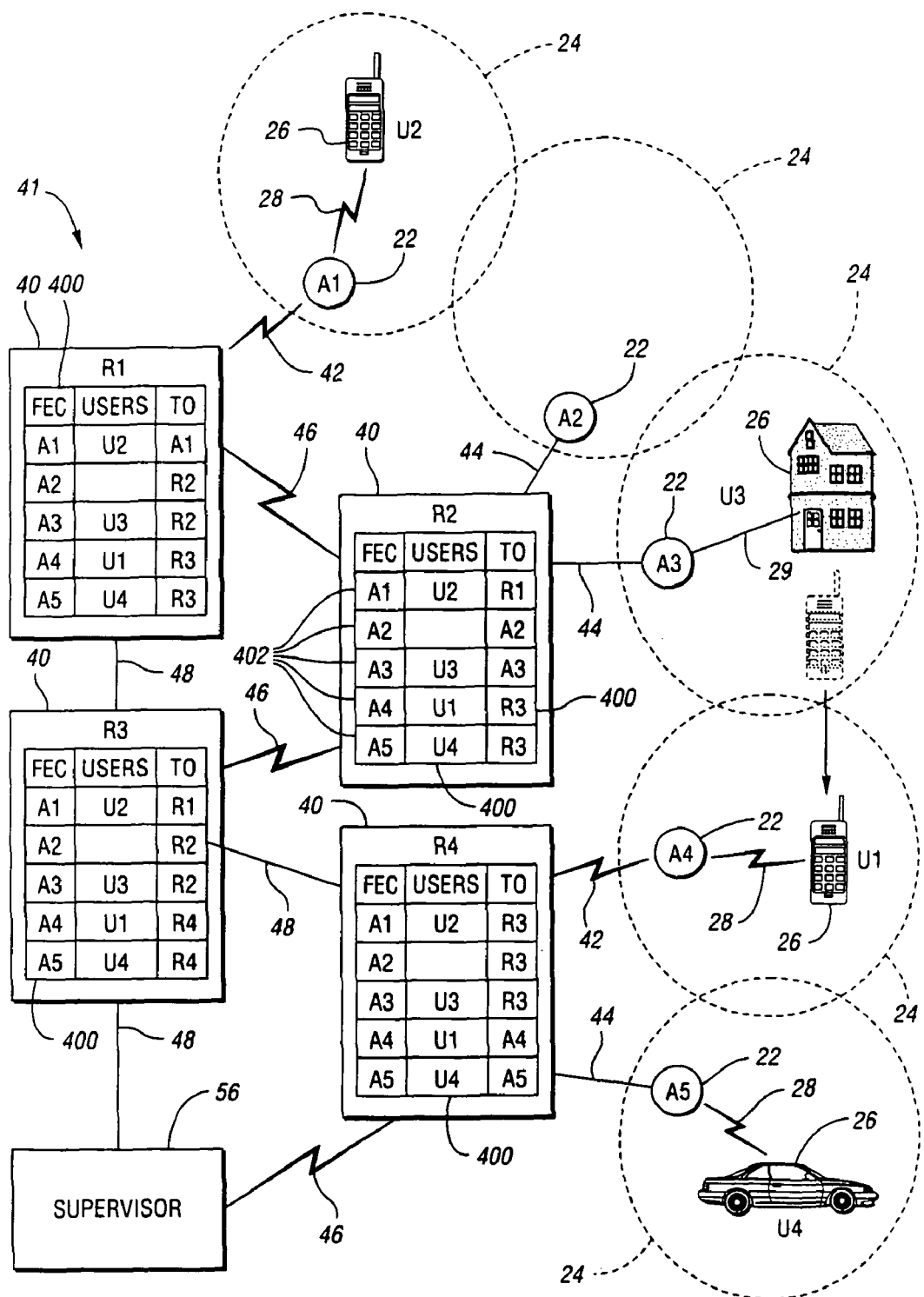
FIG. 8 is a schematic drawing illustrating forward equivalency class updating to track a moving subscriber unit according to an embodiment of the present invention.

Referring now to FIG. 8, a schematic drawing illustrating forwarding equivalency class updating to track a moving subscriber unit is shown. If subscriber unit 26 is mobile or portable, as indicated by UI in FIG. 8, subscriber unit 26 may move out of coverage area 24 for one access point 22 and into coverage area 24 for a new access point 22. The address for subscriber unit 26 is then moved from FEC 402 of original access point 22 into FEC 402 for new access point 22. In an embodiment, when original access point 22 is no longer in communication with subscriber unit 26, original access point 22 broadcasts a message to distribution points 40 and supervisor 56. If original access point 22 subsequently receives any packets for subscriber unit 26, original access point forwards these packets back into distribution point network 41. If the packets are sequentially indicated, such as IP packets, correct order will be established by subscriber unit 26 when packets are received.

Figure 9:
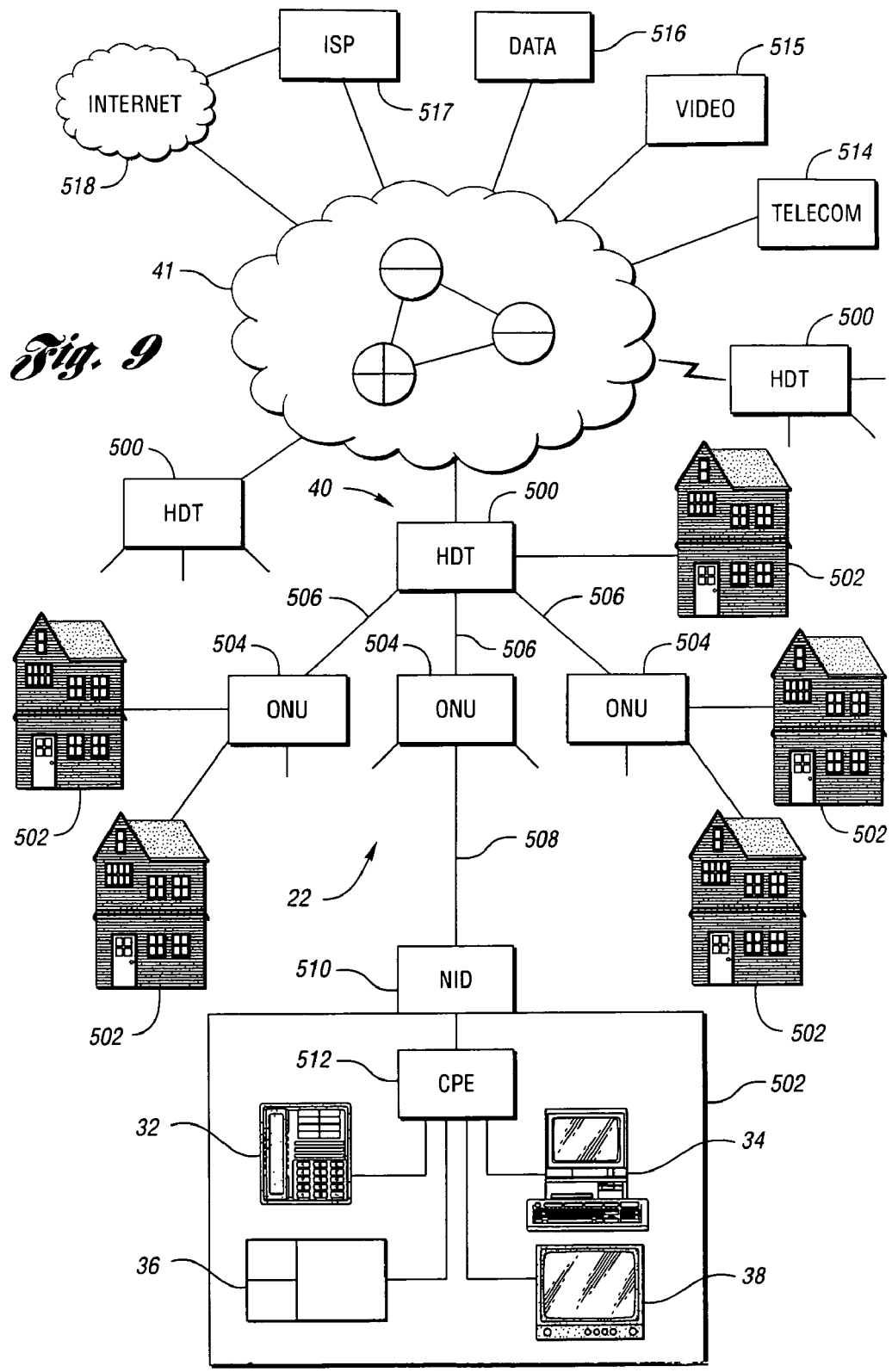
FIG. 9 is a schematic drawing illustrating distributed routing for VDSL services according to an embodiment of the present invention.

Referring now to FIG. 9, a schematic drawing illustrating high-speed information services through distributed routing and hybrid local loops according to an embodiment of the present invention is shown. Distribution point 40 that services access points 22 includes at least one host digital terminal (HDT) 500. Each HDT 500 converts a VDSL or other high-speed information packet to an optical format if that packet is destined for subscriber 502 connected through HDT 500. The VDSL packet is then forwarded to the appropriate optical network unit (ONU) 504 through fiber 506. The ONU converts the packet from an optical format into a format compatible with copper cabling 508, such as UTP, and routes the packet to a network interface device (NID) 510 at the subscriber premises. Alternatively, HDT 500 may be directly connected to NID 510 by optical fiber 506. Hence, either. HDT 500 or ONU 504 may function as an access point 22.

NID 510 receives the DSL packets and forwards the packets to customer premises (CPE) equipment 512, such as a gateway or modem. Preferably, the CPE serves as an interface for various customer communication and information devices including computers, audio and video receivers, telephones, video phones, telemetry equipment, and the like. The use of HDT 500 to carry multiple channels of information to CPE 512 is described in U.S. Pat. No. 6,542,266 titled "System and Method for Providing Broadband Data Service" to Bruce Phillips et al., issued Apr. 1, 2003, which is incorporated by reference herein.

As described above, information packets may come from a variety of sources. Information packets may transfer between subscriber units 26 within communication system 20 or between subscriber unit 26 within communication system 20 and a communication device outside of communication system 20. External communication systems interfacing with communication system 20 include service and data providers such as telecommunication system 514, video content supplier 515, data supplier 516, Internet service provider (ISP) 517, data networks such as Internet 518, and the like.

For switched video, HDT 500 or ONU 504 may also function as a video distribution center (VDC). In one embodiment, the VDC receives requests from customer gateways or subscriber units 26 and relays these requests to one or more video suppliers 515. If multiple receivers are viewing the same channel, the VDC does not duplicate the request, but rather forwards the video content to each appropriate premises 502.

Figure 10:
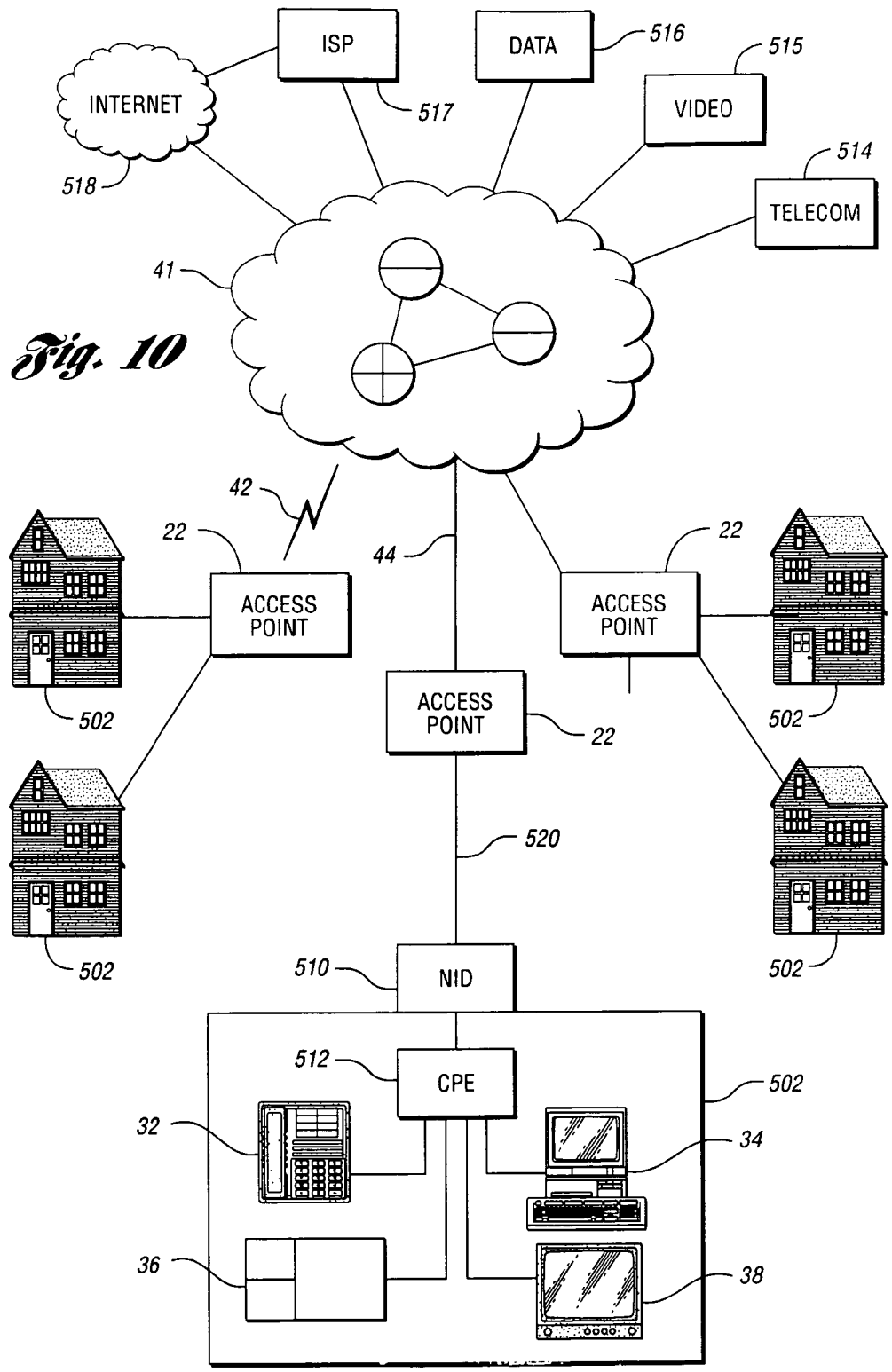
FIG. 10 is a schematic drawing illustrating VDSL services provided without a hybrid local loop according to an embodiment of the present invention.

Referring now to FIG. 10, a schematic drawing illustrating high-speed information services through distributed routing and non-hybrid local loops according to an embodiment of the present invention is shown. In this embodiment, the need for fiber-to-the-neighborhood (FTTN) is eliminated. Each NID 510 connects via DSL cabling 520 to an access point 22. Access point 22 may communicate through a distribution point by wireless connection 42, may communicate through a wire line connection 44, or may be incorporated into the distribution point 40. For switched video applications, either distribution point 40 or access point 22 may function as a VDC.

Figure 11:
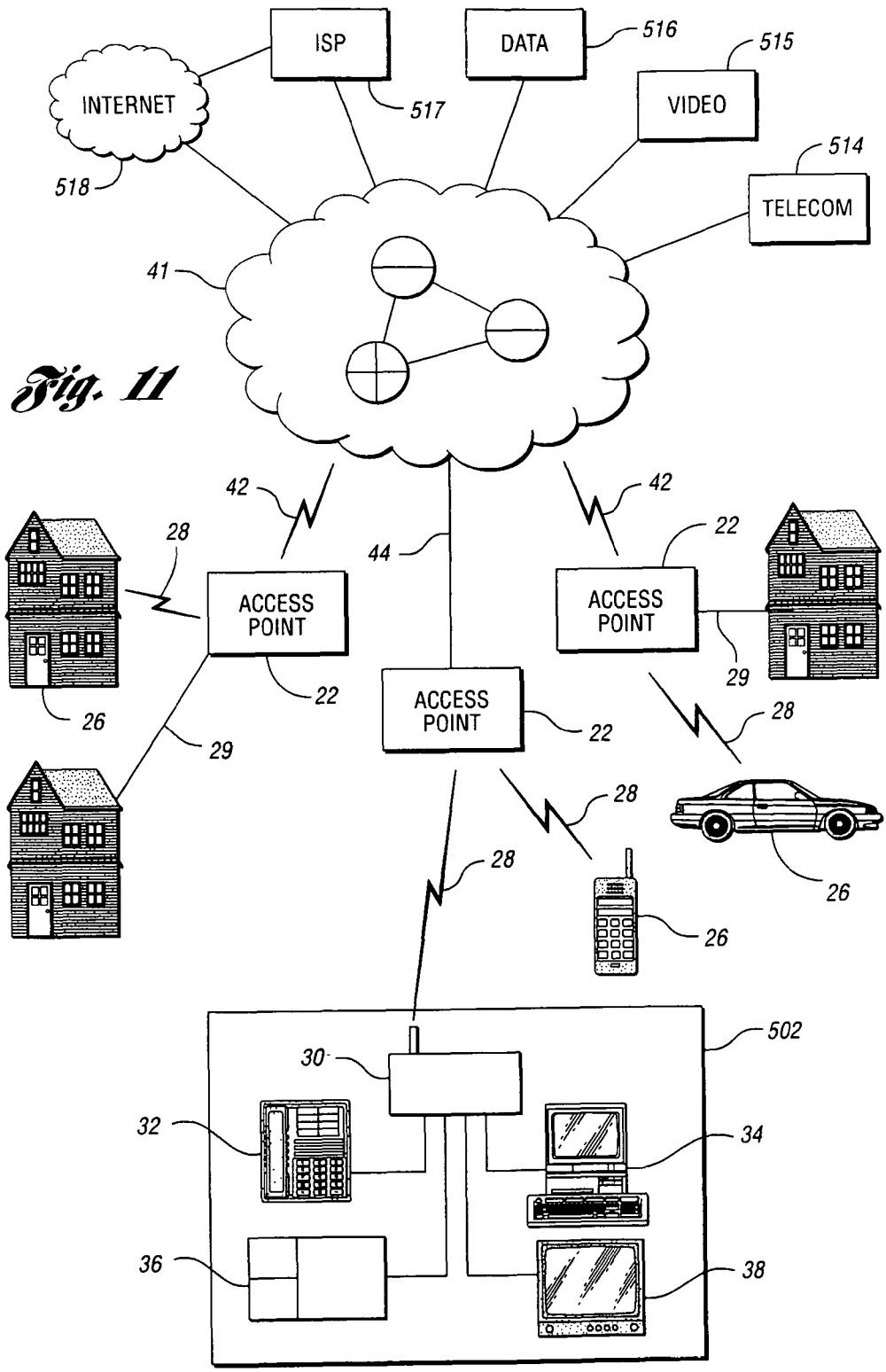
FIG. 11 is a schematic drawing illustrating wireless VDSL services according to an embodiment of the present invention.

Referring now to FIG. 11, a schematic drawing illustrating high-speed information services through distributed routing and wireless customer delivery according to an embodiment of the present invention is shown. In some or all connections, subscriber units 26 may connect to access point 22 using high-speed wireless communication links 28. Within customer premises, NID 510 and CPE 512 are replaced by terminal network controller 30. For switched video applications, either distribution point 40 or access point 22 may function as a VDC.

Figure 12:
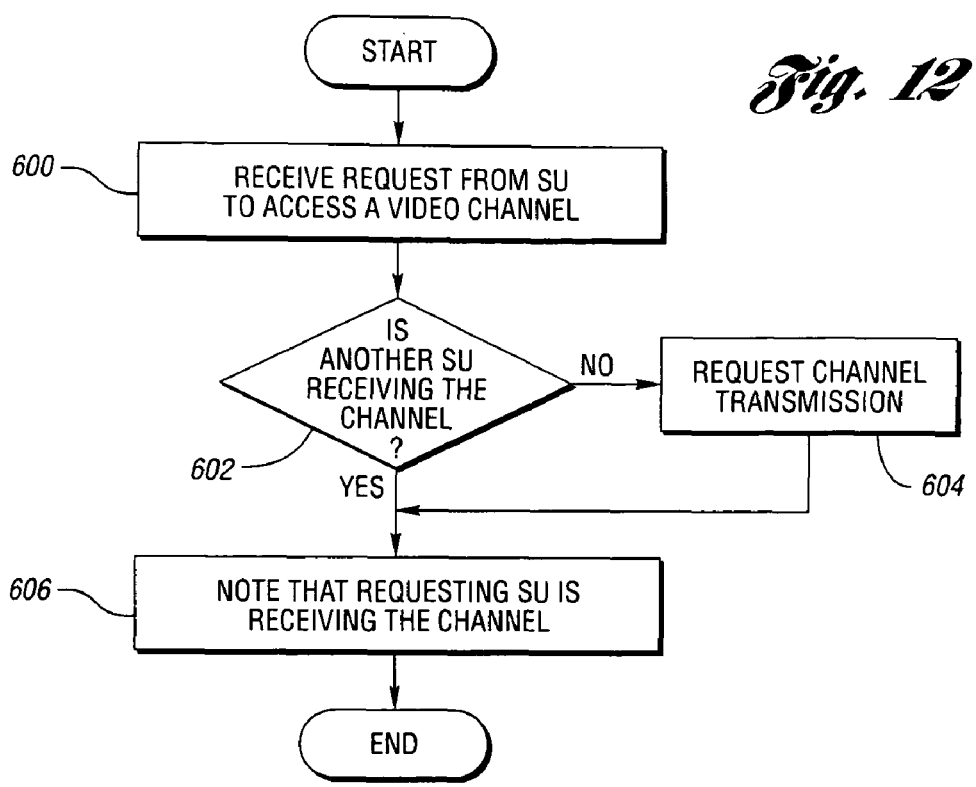
FIG. 12 is a flow diagram illustrating reception of a request for a video channel by a video distribution center according to an embodiment of the present invention.
Figure 13:
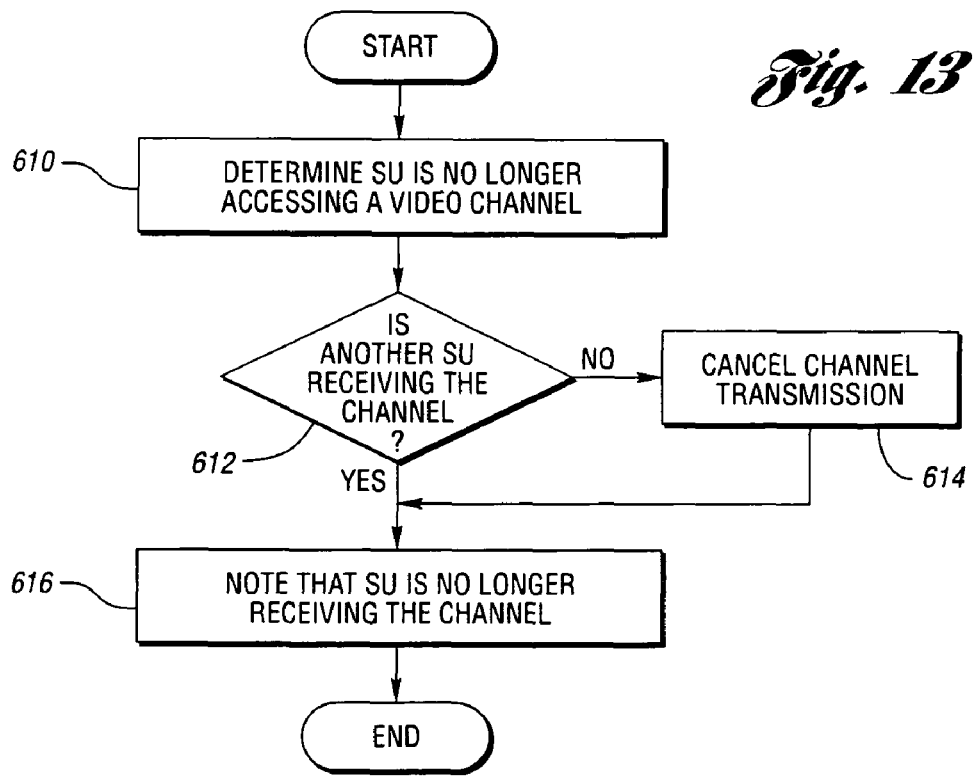
FIG. 13 is a flow diagram illustrating termination of a request for a video channel by a video distribution center according to an embodiment of the present invention.

In FIGS. 12 and 13, flow diagrams illustrating operation of a video distribution channel are provided. As will be appreciated by one of ordinary skill in the art, the operations illustrated in the flow diagrams are not necessarily sequential operations. The order of steps may be modified within the spirit and scope of the present invention. Also, the methods illustrated in FIGS. 12 and 13 may be implemented by any combination of hardware, software, firmware, and the like. The present invention transcends any particular implementation and the embodiment is shown in sequential flow chart form for ease of illustration. Further, while the particular implementation of a video channel is described, it will be recognized that the present invention is applicable to any type of broadcast information, including audio, emergency response information, data distribution, conferencing, safety and security information, advertisements, public service announcements, gaming, and the like.

Referring now to FIG. 12, a flow diagram illustrating reception of a request for a video channel by a VDC according to an embodiment of the present invention is shown. The VDC receives a request from subscriber unit 26 to access a video channel in block 600. This request may be received as a message generated by user selection, such as by changing the channel on an entertainment receiver, or by having subscriber unit 26 enter coverage area 24 controlled by a routing element functioning as the VDC such as access point 22 or distribution point 40.

A check is made to determine if another subscriber unit 26 served by the VDC is receiving the requested video channel in block 602. If not, the VDC requests that information packets for the video channel be transmitted to the VDC in block 604. In an embodiment, the VDC gives a dummy address as the destination for the requested video channel information packets. This dummy address may be the IP or ATM address of the VDC, or may be the address of a fictitious subscriber unit 26 assigned to the VDC. The dummy address permits various subscriber units 26 to request and terminate a video channel from the VDC without disturbing any distribution to other subscriber units 26 that may be receiving the same video channel through the VDC.

A notation is made that the requesting subscriber unit 26 is receiving the video channel in block 606. This may be done by keeping a simple table of subscriber units 26 and received video channels, by entries into a database, by creation of objects holding the subscriber unit 26 and video channel information, or by any other method of mapping subscriber units 26 and video channels. This notation is preferably kept by the VDC but may also be kept by the video channel provider, supervisor 56, or any other suitable component. The notation is used by the VDC to replicate or broadcast each video packet to all subscriber units 26 requesting the video channel containing the video packet.

Referring now to FIG. 13, a flow diagram illustrating termination of a request for a video channel by a video distribution center according to an embodiment of the present invention is shown. The VDC determines that subscriber unit 26 is no longer accessing a particular video channel in block 610. This determination may be based on receiving a message from subscriber unit 26 that the video channel is no longer needed or may be based on determining that subscriber unit 26 is no longer in coverage area 24 served by the VDC.

A check is made in block 612 to determine if any other subscriber unit 26 is receiving the video channel. If no other subscriber unit 26 is receiving the video channel, channel transmission is canceled in block 614. A notation is made that subscriber unit 26 is no longer receiving the video channel in block 616.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for distributing high-speed packetized information to a plurality of subscriber units, comprising:
a distributed routing network comprising a plurality of distribution points, each of the plurality of distribution points in communication with at least one access point, each of the at least one access points having a coverage area adapted to service at least one of the plurality of subscriber units, wherein,
a first of the plurality of distribution points is adapted to,
receive the high-speed packetized information from a first subscriber unit, the high-speed packetized information being destined for a second subscriber unit in a coverage area serviced by a second of the plurality of distribution points comprising a host digital terminal distribution center, and
forward the high-speed packetized information directly to the host digital terminal distribution center without routing the high-speed packetized information through a central office, the host digital terminal distribution center adapted to convert the high-speed packetized information to an optical format;
at least one access point in communication with the host digital terminal distribution center, the access point comprising an optical network unit adapted to receive the high-speed packetized information from the distributed routing network and convert the high-speed packetized information from the optical format to a second format;
a network interface device adapted to receive the high-speed packetized information from the optical network unit and forward the high-speed packetized information in the second format to the second subscriber unit.

2. The system of claim 1, wherein the second format is compatible with copper wiring.

3. The system of claim 1, wherein the second format is compatible with coaxial cable.

4. The system of claim 1, wherein the high-speed packetized information is provided through a VDSL service.

5. The system of claim 1, wherein the high-speed packetized information is provided through a fiber optic service.

6. The system of claim 1, wherein the host digital terminal distribution center provides a plurality of video channels for distribution to the plurality of subscriber units.

7. The system of claim 1 wherein at least one of the plurality of subscriber units comprises a mobile device in communication with the at least one access point through a wireless connection.

8. The system of claim 1 wherein at least one of the subscriber units comprises a device in communication with the network interface device through a wired connection.

9. The system of claim 1 wherein the network interface device is a set-top box located at the subscriber premises.

10. The system of claim 1 wherein the network interface device is a gateway at the subscriber premises adapted to forward the high-speed packetized information to the subscriber premises.

11. The system of claim 1 wherein the network interface device is a decoder.

12. A system for distributing high-speed packetized information to a plurality of subscriber units, comprising:
a host digital terminal video distribution center for storing data and converting the data to high-speed packetized information in an optical format;
a distributed routing network comprising a plurality of distribution points, wherein a first of the plurality of distribution points is adapted to,
receive the high-speed packetized information from the host digital terminal video distribution center, the high-speed packetized information being destined for a one of the plurality of subscriber units in a coverage area serviced by a second of the plurality of the distribution points, and
forward the high-speed packetized information directly to the second of the plurality of distribution points without routing the high-speed packetized information through a central office;
an optical network unit adapted to receive the packetized information from the second of the plurality of distribution points and convert the high-speed packetized information from the optical format to a second format, wherein, the optical network unit comprises a coverage area adapted to service the one of the plurality of subscriber units; and
a network interface device adapted to receive the high-speed packetized information from the optical network unit and forward the high-speed packetized information in the second format to the one of the plurality of subscriber units.

13. The system of claim 12, wherein the data stored on the host digital terminal video distribution center comprises a plurality of information channels adapted to be accessed by multiple subscriber units.

14. The system of claim 13, wherein the host digital terminal video distribution center is adapted to receive a request from at least one of the plurality of subscriber units to access one of the plurality of information channels.

15. The system of claim 14, wherein the host digital terminal video distribution center is adapted to,
respond to the request from the at least one of the plurality of subscriber units to access one of the plurality of information channels; and
deliver the one of the plurality of information channels to the one of the plurality of subscriber units.

16. A method of distributing high-speed information packets to at least one of a plurality of subscriber units, comprising:
storing data at a first distribution point comprising a host digital terminal distribution center;
converting the data into a plurality of high-speed information packets;
converting the plurality of high speed information packets into an optical format;
forwarding at least one of the plurality of high-speed information packets from the host digital terminal distribution center directly to a second distribution point through a distributed routing network without using a mobile switching center;
forwarding the at least one of the plurality of high-speed information packets from the second distribution point to an access point comprising an optical network unit;
converting the at least one of the plurality of high-speed information packets from the optical format to a second format;
forwarding the at least one of the plurality of high-speed information packets in the second format from a network interface device to the at least one of a plurality of subscriber units.

17. The method of claim 16 further comprising:
processing a request at the at least one of a plurality of subscriber units to access the data stored at the host digital terminal distribution center; and
determining if the data stored at the host digital terminal distribution center is available for distribution.

18. The method of claim 17 wherein processing a request at the at least one of a plurality of subscriber units to access the data stored at the host digital terminal distribution center comprises determining that the at least one of a plurality of subscriber units requesting the access is within the coverage area of the host digital terminal distribution center.

19. The method of claim 17 wherein processing a request at the at least one of a plurality of subscriber units to access the data stored at the host digital terminal distribution center comprises receiving a message from the at least one of a plurality of subscriber units.

20. The method of claim 16 further comprising transmitting a dummy address as the destination for the data, the dummy address permitting one or more subscriber units to request and terminate a video channel from the host digital terminal distribution center without disrupting the distribution of the same video channel to any other subscriber units.

21. The method of claim 16, further comprising:
determining that the at least one of the plurality of subscriber units is no longer accessing the data;
terminating transmission of the data; and
noting that the at least one of the subscriber units is no longer receiving the data.

22. The system of claim 1 wherein, at least one of the host digital terminal distribution center and optical network unit comprises a video distribution center, the video distribution center adapted to receive and relay requests between a video supplier and at least one of a customer gateway and one of the plurality of subscriber units.

23. The method of claim 16 further comprising, adding a new access point to the distributed network, wherein the access point further comprises a distribution point.

* * * * *

UNITED STATES PATENT AND TRADEMARK OFFICE
CERTIFICATE OF CORRECTION

PATENT NO.         : 8,005,077 B1
APPLICATION NO.    : 09/605696
DATED              : August 23, 2011
INVENTOR(S)        : Angus O. Dougherty et al.

Page 1 of 1

It is certified that error appears in the above-identified patent and that said Letters Patent is hereby corrected as shown below:

Column 1, Line 62, delete "ONU is connects" and insert --ONU is connected--, therefor.

Column 14, Line 27, delete "Hence, either." and insert --Hence, either--, therefor.

Signed and Sealed this
Twenty-ninth Day of May, 2012

David J. Kappos
*Director of the United States Patent and Trademark Office*